C. K. EDWARDS AND A. S. COLLING.
AUTOMOBILE VEHICLE.
APPLICATION FILED JUNE 2, 1920.
1,386,557.
Patented Aug. 2, 1921.
2 SHEETS—SHEET 2.
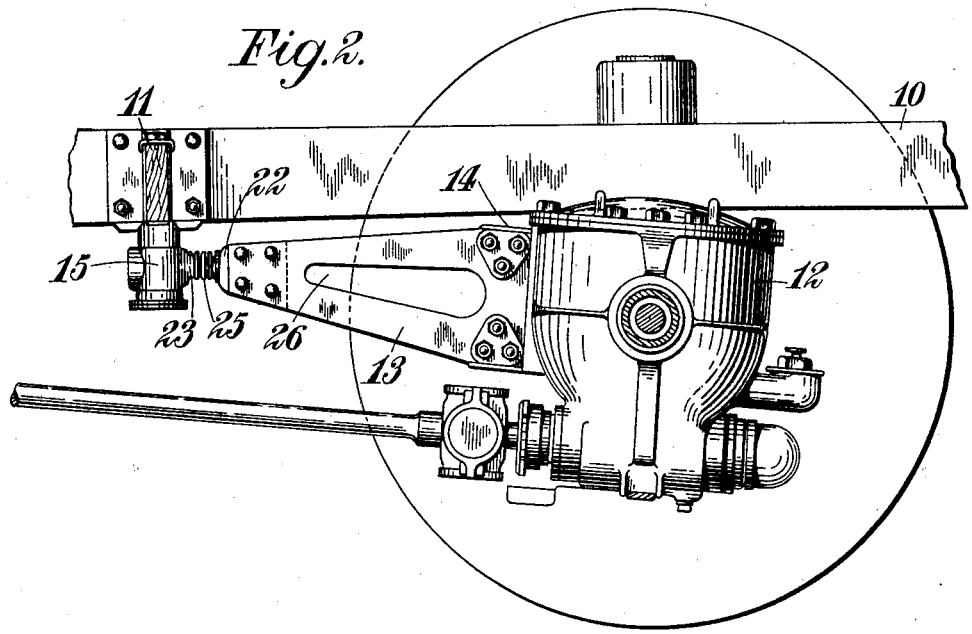
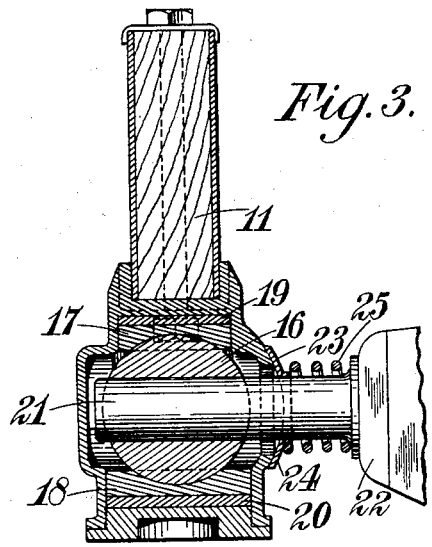
Inventors
Charles Kearns Edwards,
Alfred Sidney Colling,
by Bakewell, Byrnes Parmelee
their Attys.

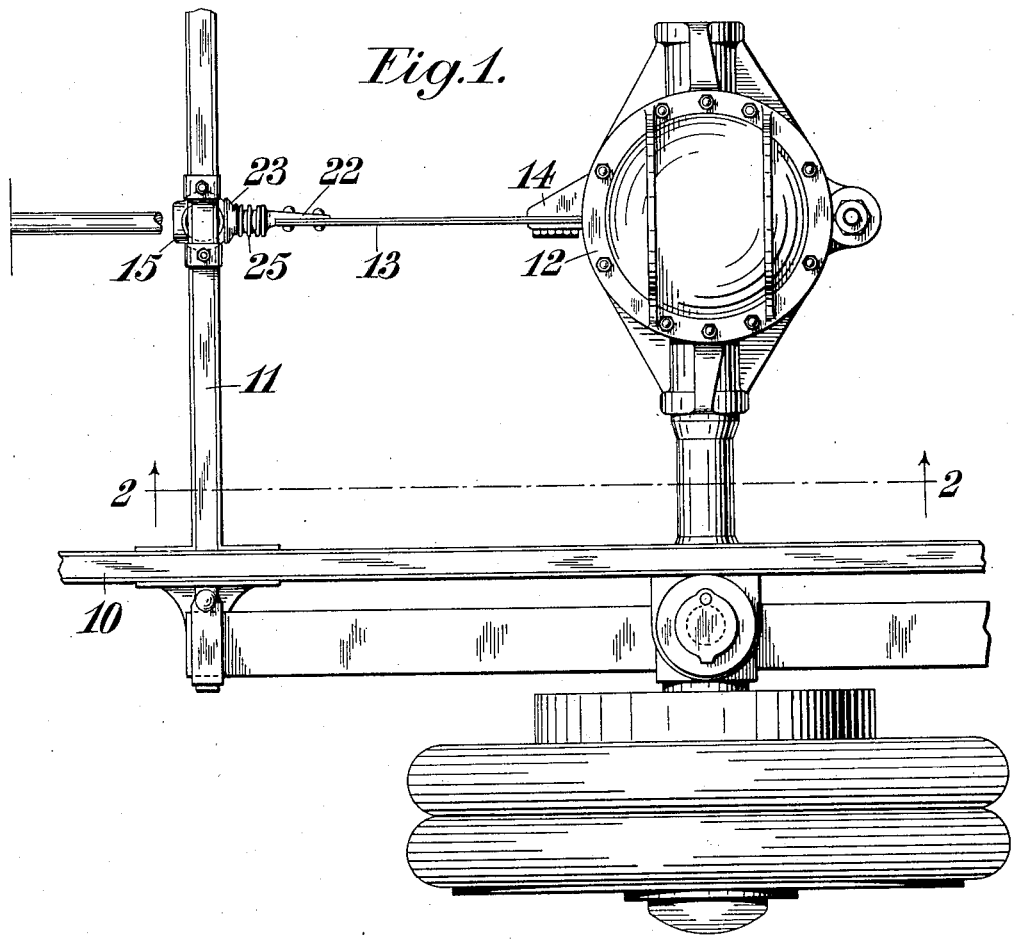

UNITED STATES PATENT OFFICE.

CHARLES KEARNS EDWARDS, OF CHINGFORD, LONDON, AND ALFRED SIDNEY COLLING, OF FINCHLEY, LONDON, ENGLAND.

AUTOMOBILE-VEHICLE.

1,386,557.　　　　　Specification of Letters Patent.　　Patented Aug. 2, 1921.

Application filed June 2, 1920. Serial No. 385,976.

*To all whom it may concern:*

Be it known that we, CHARLES KEARNS EDWARDS, subject of the King of England, residing at Chingford, London, England, and ALFRED SIDNEY COLLING, subject of the King of England, residing at Finchley, London, England, have invented certain new and useful Improvements in Automobile-Vehicles, of which the following is a specification.

This invention is for improvements in or relating to automobile vehicles and has for one of its objects to provide a lighter, cheaper, and generally more efficient construction of the torque member which as is well known is connected at one of its ends to the gear casing around the rear axle and at its other end is connected to the chassis by universal joints and which is employed to counteract the turning effort about the rear axle imparted to the said gear casing by the transmission of a driving effort to the wheels inside it. Usually this torque member is supported at one end by a ball and pin joint carried by the chassis and at the other end is connected to the gear casing around the rear axle by a vertical pivot. This jointed and pivoted construction is adopted because when the rear wheels pass over any inequalities in the road surface the axle is generally displaced endwise and carries the torque member out of its normal position in the longitudinal vertical plane of the chassis in which the ball center is situated. If the torque member were rigidly connected at its two ends to the chassis and the gear casing and were of the usual form, distortion or breakage would doubtless result, especially as in addition to the endwise movement of the axle it also tries to tilt about an axis which does not pass through the ball center. Owing to this tilting effort of the axle the vertical pivot is subjected to very heavy stresses and usually very soon wears and becomes a source of annoyance on the vehicle, and requires renewal.

According to the primary feature of the present invention there is provided a torque member for the rear axle of an automobile vehicle, which torque member is a spring blade and is deep and thin and is arranged as to its cross-section with its greater dimension vertical. The spring blade should be deep enough to be stiff and strong as regards bending stresses applied in the vertical plane, as by the driving torque, but thin enough to yield elastically to twisting-couples having their axes lengthwise of the torque member but not passing through the ball-joint center and also thin enough to yield elastically under lateral bending stresses applied to it in or about in the horizontal plane. This torque member is preferably connected at its after end rigidly and directly to the rear-axle gear-box.

Another improved torque member for the rear-axle of an automobile vehicle according to this invention is a modification of that above described in that it comprises instead of a torque member springy throughout its length, an elastic intermediate portion which is a spring blade as above but forms a middle or intermediate part only and is the sole connection between the ends of the member, which ends are rigid and are rigidly connected thereto, the after end being preferably directly connected as in the former example to the rear-axle gear-box.

For a more complete understanding of the invention there will now be described, by way of example only and with reference to the accompanying drawings, one constructional form of torque member according to the invention. It is to be understood, however, that the invention is not limited to the precise constructional details enumerated.

In these drawings:—

Figure 1 is a plan view of a portion of a vehicle chassis showing the torque member in position;

Fig. 2 is a vertical section on the line 2—2 of Fig. 1, and

Fig. 3 is a vertical section through a ball and sliding pin joint between one end of the torque member and the chassis, the parts being shown on a larger scale than that of Figs. 1 and 2.

Like reference numerals indicate like parts throughout the drawings.

A chassis longitudinal member is indicated at 10, a transverse chassis member at 11 and the differential casing around the rear-axle at 12. A torque member 13 connects the casing 12 to the chassis member 11. This torque member consists of a deep springy plate bolted at one end to a lug or lugs 14 projecting from the casing 12. The torque member 13 is secured at its other end, which lies forward of the rear axle, to a ball and sliding pin joint connection 15 carried by the chassis. This connection 15 comprises a casing which is bolted to the chassis member 11 and incloses a ball 16 which is received between two cups 17, 18 seated upon rubber packing pieces 19 and 20. The ball 16 has a cylindrical hole through it in which is mounted free to slide a pin 21 having a flattened extension 22 which is secured, say by riveting, to the torque member 13. A dust cover 23 received upon a spherical seat 24 and controlled by a spring 25 may be employed to resist the entrance of dust into the interior of the connection 15.

The torque member 13 is shown as being arranged with its wide faces vertical and it may conveniently be deeper at the rear axle end than at the forward end and may have a lightening aperture 26 toward its middle portion. The spring plate forming the torque member, which is thin as compared with its depth, will withstand any turning effort imparted to the casing 12 around the rear axle and will twist or bend or both twist and bend when the axle is displaced by road irregularities as hereinbefore described.

Instead of the torque member 13 being made of a single piece of spring plate it could be laminated, that is to say constructed of a number of thinner sheets placed together. The plate would, however, still be deep and stiff vertically. In Fig. 1 the torque member is shown as being formed of two thin plates placed together face to face.

It will be appreciated that instead of the torque member being springy throughout the whole or practically the whole of its length as in the construction illustrated in the drawings, it could be composed of two rigid end pieces with an elastic intermediate portion. This intermediate portion could be relatively shorter than the springy plates illustrated in the drawings, but it should be composed of a spring blade which forms the sole connection between the rigid ends which should be rigidly connected to it.

The particular form of ball and sliding pin joint shown in the drawings while it has a number of advantages, is not essential to the present invention and may be modified as desired.

What we claim as our invention and desire to secure by Letters Patent is:—

1. For an automobile vehicle, a torque member for the rear axle which is a spring blade and which, for the purpose described, is deep and thin and arranged as to its cross section with its greater dimension vertical.

2. For an automobile vehicle, a torque member for the rear axle, which has rigid ends, and a laterally elastic intermediate portion rigidly connected to said ends and forming the sole connection between them.

3. For an automobile vehicle, a torque member for the rear axle, which comprises rigid ends and an elastic intermediate portion, which is a spring blade, is deep and thin and arranged as to its cross section with its greater dimension vertical, is rigidly connected to said ends and forms the sole connection between them.

4. In a automobile vehicle, the combination of a rear axle casing, a chassis member situated forwardly thereof, a torque member extending between said casing and said chassis member, a rigid connection between one end of the torque member and the said casing, and a ball and sliding pin connection between the other end of the torque member and the said chassis member, part of said torque member being a spring blade which is deep and thin and arranged as to its cross section with its greater dimension vertical.

5. In an automobile vehicle, the combination of a rear axle casing, a chassis member situated forwardly thereof, a torque member extending between said casing and said chassis member, a rigid connection between one end of the torque member and the said casing, and a ball and sliding pin connection between the other end of the torque member and the said chassis member, the ends of said torque member being rigid and the intermediate portion thereof being elastic, being rigidly connected to the ends, and forming the sole connection between them.

6. In an automobile vehicle, the combination of a rear axle casing 12, 14, a chassis member 11 situated forwardly thereof, a torque member 13, 26, extending between said casing and said chassis member, a rigid connection between one end of the torque member and the said casing, and a ball and sliding pin connection 15, 16, 17, 18, 19, 20, 21, 22 between the other end of the torque member and the said chassis member.

7. In an automobile vehicle, the combination of a rear axle casing 12, 14, a chassis member 11 situated forwardly thereof, a torque member 13, 26 extending between said casing and said chassis member, a rigid connection between one end of the torque member and the said casing, a ball and sliding pin connection 15, 16, 17, 18, 19, 20, 21, 22, 24 between the other end of the torque member and the said chassis member, and a spring pressed dust cover 23, 25, for said ball and sliding pin connection.

In testimony whereof we have signed our names to this specification.

CHARLES KEARNS EDWARDS.
ALFRED SIDNEY COLLING.